United States Patent
Candelore

(10) Patent No.: US 7,840,489 B2
(45) Date of Patent: Nov. 23, 2010

(54) KEY SHARING FOR DRM INTEROPERABILITY

(75) Inventor: Brant L. Candelore, San Digeo, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 325 days.

(21) Appl. No.: 11/479,404

(22) Filed: Jun. 30, 2006

(65) Prior Publication Data

US 2007/0005506 A1    Jan. 4, 2007

Related U.S. Application Data

(60) Provisional application No. 60/696,176, filed on Jul. 1, 2005.

(51) Int. Cl.
*G06F 21/00* (2006.01)
(52) U.S. Cl. .............................. 705/59; 705/51; 705/57; 380/201; 380/278; 380/282; 713/193
(58) Field of Classification Search ............. 705/51–59; 380/201, 278, 282; 713/193
See application file for complete search history.

(56) References Cited

U.S. PATENT DOCUMENTS

| | | | |
|---|---|---|---|
| 4,802,215 A | 1/1989 | Mason | |
| 4,803,725 A | 2/1989 | Horne et al. | |
| 5,091,936 A | 2/1992 | Katznelson et al. | |
| 5,742,680 A | 4/1998 | Wilson | |
| 5,850,218 A | 12/1998 | LaJoie et al. | |
| 5,897,218 A | 4/1999 | Nishimura et al. | |
| 5,917,915 A | 6/1999 | Hirose | |
| 6,028,932 A | 2/2000 | Park | |
| 6,061,451 A | 5/2000 | Muratani et al. | |
| 6,105,134 A | 8/2000 | Pinder et al. | |
| 6,125,349 A | 9/2000 | Maher | |
| 6,157,719 A | 12/2000 | Wasilewski et al. | |
| 6,166,780 A | 12/2000 | Bray | |
| 6,307,939 B1 | 10/2001 | Vigarie | |
| 6,330,672 B1 | 12/2001 | Shur | |
| 6,487,646 B1 | 11/2002 | Adams et al. | |
| 6,609,039 B1 | 8/2003 | Schoen | |
| 6,824,051 B2 * | 11/2004 | Reddy et al. ................. | 235/380 |
| 6,834,110 B1 | 12/2004 | Marconcini et al. | |
| 7,039,614 B1 | 5/2006 | Candelore | |

(Continued)

FOREIGN PATENT DOCUMENTS

JP        2003330897        11/2003

OTHER PUBLICATIONS

Electronic Industries Alliance, "EIA Standard, Digital Television (DTV) Closed Captioning" Dec. 1999, EIA-708-B.

(Continued)

*Primary Examiner*—Pierre Eddy Elisca
*Assistant Examiner*—Shahid Kamal
(74) *Attorney, Agent, or Firm*—Blakely, Sokoloff, Taylor & Zafman LLP

(57) ABSTRACT

According to one embodiment, a method comprises generating a cryptographic key and sharing the cryptographic key with a plurality of digital rights management (DRM) systems supplied by different providers. This provides flexibility in using any DRM system by media receiving devices targeted to receive media.

10 Claims, 7 Drawing Sheets

U.S. PATENT DOCUMENTS

| | | | |
|---|---|---|---|
| 7,107,462 B2* | 9/2006 | Fransdonk | 713/193 |
| 7,233,668 B2* | 6/2007 | Weinstein et al. | 380/201 |
| 7,702,589 B2 | 4/2010 | Candelore | |
| 2002/0186843 A1* | 12/2002 | Weinstein et al. | 380/201 |
| 2003/0076955 A1* | 4/2003 | Alve et al. | 380/201 |
| 2003/0161476 A1* | 8/2003 | Fransdonk | 380/282 |
| 2003/0217011 A1* | 11/2003 | Peinado et al. | 705/59 |
| 2006/0210084 A1* | 9/2006 | Fransdonk | 380/278 |

OTHER PUBLICATIONS

"U.S. Appl. No. 09/437,590", *Office Action mailed* May 21, 2002.
"U.S. Appl. No. 09/437,590", *Office Action mailed* Oct. 29, 2002.
"U.S. Appl. No. 09/437,590", *Final Office Action mailed* May 20, 2003.
"U.S. Appl. No. 09/437,590", *Office Action mailed* Dec. 5, 2003.
"U.S. Appl. No. 09/437,590", *Final Office Action mailed* Jun. 3, 2004.
"U.S. Appl. No. 10/209,341", *Office Action mailed* Mar. 17, 2004.
"U.S. Appl. No. 10/209,341", *Final Office Action mailed* Jun. 8, 2004.
"U.S. Appl. No. 10/209,341", *Office Action mailed* Jan. 13, 2005.
"U.S. Appl. No. 10/209,341", *Office Action mailed* Jan. 4, 2006.
"U.S. Appl. No. 10/209,341", *Office Action mailed* Jun. 19, 2006.
"U.S. Appl. No. 10/209,341", *Office Action mailed* Dec. 18, 2006.
"U.S. Appl. No. 10/209,341", *Office Action mailed* Jul. 26, 2007.
"U.S. Appl. No. 10/209,341", *Office Action mailed* Jan. 10, 2008.
"U.S. Appl. No. 10/209,341", *Final Office Action mailed* Aug. 7, 2008.
Benini, Luca, et al., "Energy-Efficient Data Scrambling on Memory Processor Interfaces", *ISLPED '03*, Aug. 25-27, 2003, Seoul, Korea.

\* cited by examiner

KEY SHARING FOR DRM INTEROPERABILITY

This application claims priority benefit of U.S. Provisional patent Application No. 60/696,176 filed Jul. 1, 2005 and is hereby incorporated by reference herein.

BACKGROUND

1. Field

Embodiments of the invention relate to digital rights management (DRM). More specifically, one embodiment of the invention relates to an apparatus and method for key sharing by different DRM systems.

2. General Background

Recently, digital rights management (DRM) has become an increasingly important mechanism for protecting copyrighted media that is distributed for use by consumers. DRM technologies are used to enforce specified rules regarding usage of the media by a consumer. As an example, a DRM could be used within the context of a digital television receiver device (e.g., a set top box or television receiver) so that a movie that is received from a media provider can be recorded in digital form and played back a set number of times over a period of time. In another example, the DRM could be used to specify that playback can only occur on a particular device (e.g., a set top box having a disc drive such as a Personal Video Recorder "PVR").

With the advent of home networks, digital media can be shared between devices. Set-top boxes are being built with Ethernet and IEEE 1394 connections allowing compressed digital media to be shared amongst authorized devices such as televisions, Personal Digital Assistants (PDAs) and digital-VCRs. A problem currently exists in that all devices must have a common DRM scheme to receive media. Control of the DRM technology is deemed of strategic importance to many companies and there is great reluctance to include this technology in expensive, generic devices such as TVs and digital-VCRs.

For instance, there is a movement to solely deploy a single type of DRM within digital television receiver devices. This limited usage is partially due to the fact that conventional digital television receiver devices are incapable of supporting multiple DRMs in a secure and inexpensive manner. This is problematic from a compatibility standpoint, especially since more and more devices are being implemented with different types of DRMs. Moreover, supporting a single DRM can be quite restrictive for future product designs by requiring continued support of a particular DRM supplier.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
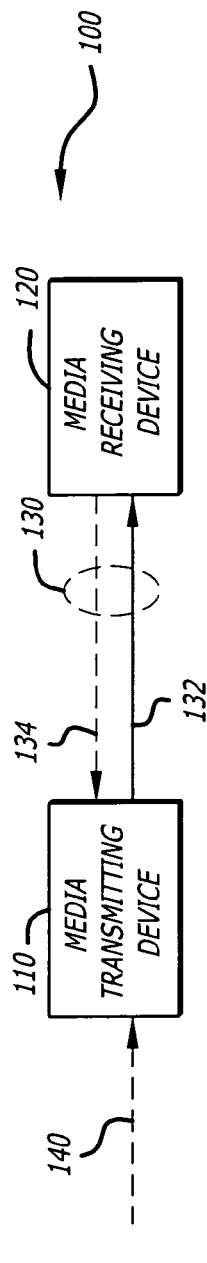
FIG. 1 is an exemplary block diagram of an embodiment of a media transmission system consistent with certain embodiments of the invention.

Various embodiments of the invention relate to digital rights management (DRM) interoperability where one or more cryptographic keys are shared between DRM systems. The key sharing is accomplished by logic implemented in a media transmitting device. The embodiments described below are merely illustrative in nature, and not intended to limit the invention to any of the specific embodiments shown and described. In the description below, like reference numerals are used to describe the same, similar or corresponding parts in the several views of the drawings.

In the following description, certain terminology is used to describe features of the invention. For example, the terms "encrypt" and "scramble" and variations thereof are used synonymously herein to describe any technique of obfuscating information. The term "media" and variations thereof is used synonymously herein to describe content such as audio, visual or audio/visual data that can be played back and perceived by a consumer. For instance, the media may be a movie (A/V data) that is played back on a television set or similar monitor device. The media may be text or an image (visual data) or music (audio).

An "interconnect" is generally defined as an information-carrying medium that establishes a communication pathway. The interconnect may be a wired interconnect, where the medium is a physical medium (e.g., electrical wire, optical fiber, cable, phone lines, etc.) or a wireless interconnect (e.g., air in combination with satellite or other wireless technology).

The term "logic," as used herein, is defined as hardware and/or software. Software is generally considered to be executable code such as an application, an applet, a routine or even one or more executable instructions stored in a storage medium. Firmware is considered merely one type of software. The "storage medium" may include, but is not limited or restricted to a programmable electronic circuit, a semiconductor memory device, a volatile memory (e.g., random access memory, etc.), a non-volatile memory (e.g., read-only memory, flash memory, a hard drive, etc.), a portable memory device (e.g., floppy diskette, a compact disk "CD", digital versatile disc "DVD", a digital tape, a Universal Serial Bus "USB" flash drive), or the like.

The term "program", as used herein, is defined as a sequence of instructions designed for execution on a computer system. Examples of program may include a subroutine, a function, a procedure, an object method, an object implementation, an executable application, an applet, a servlet, a source code, an object code, a shared library/dynamic load library and/or other sequence of instructions designed for execution on a computer system. The terms "including" and/or "having", as used herein, are defined as comprising (i.e., open language).

For purposes of this document, a distinction is drawn between Conditional Access (CA) and Digital Rights Management (DRM). In general, legacy CA systems utilize Entitlement Control Messages (ECMs) and/or Entitlement Management Messages (EMMs) with or without a smart card or CableCard™), are used to permit or prohibit a recipient of encrypted media to view media. Thus, a legacy CA system (simply referred to as a "CA system") can be considered to be a rudimentary technique in managing digital rights, associated merely with a simple purchase and real-time access to programming. DRM systems, in contrast, are used as a more sophisticated form of protection in which additional restrictions can be imposed upon the use of media over and above that provided in legacy CA systems.

The authorization and key management methods used in a DRM system are incompatible with a legacy CA system, and unless standardized, are generally incompatible with each other. With the advent of Digital Video Recorders (DVRs), also known as Personal Video Recorders (PVRs), digital media can now be stored in the set-top box in its transmitted resolution along with meta data controlling its use. The media may be stored on an internal or external hard drive or recorded to DVD. Media distributors are being required by media providers to secure digital media.

Using legacy CA, the hard drive and DVD may be cryptographically tethered to a particular set-top box by encrypting media to that storage medium and decrypting media when receiving it back from that medium. Media recorded by the set-top box may be unplayable in other set-top boxes and may have no expiration except that on a hard drive, the capacity of the drive is eventually used up and the viewer needs to erase media in order to make room for new media. Using DRM, however, the recorded media can be now be shared with other devices and may have more extensive usage rules. DRM is aware of these more extensive usage rules and the various devices and networks on which customers want to share media.

The playback of the media can be subject to extensive usage rules. For example, in a DRM system, rights can be established on the basis of time, target device, number of plays or other restraints. Such rights are determined, in current DRM systems, by virtue of a set of DRM meta data that accompanies the media. This meta data can be hashed in such a way to generate a key or data input to key decryption operations. Hashing the meta data and generating keys is one way of authenticating the meta data in order to prevent manipulation by a hacker. Such DRM meta data contains usage rules that are used to control authorized use to set-top boxes and devices attached to the set-top boxes on the home network.

In summary, legacy CA is generally controlled by entitlement message (ECMs and EMMs) to manage keys used in a decryption process. DRM is a metadata driven encryption system capable of more sophisticated restrictions imposed by usage rules forming a part of the metadata.

According to one embodiment of the invention, media may be received 100% encrypted from the service provider. The encrypted media is decrypted, and then re-encrypted by a key shared by multiple DRM systems within a media transmitting device. The media transmitting device in the media transmission system supports multiple (at least two) DRM systems and provides encrypted versions of the shared key to one or more devices targeted to receive the media for recovery of the re-encrypted media in clear form. Media may be decrypted in real-time or stored in an encoded format.

Referring to FIG. 1, an exemplary block diagram of an embodiment of a media transmission system 100 is shown. Media transmission system 100 comprises a media transmitting device 110 and a media receiving device 120 in communication over an interconnect 130. Media transmitting device 110 may be implemented as a computer, a set-top box or any other device that is adapted to receive media 140 from a remotely located source, to fully (100%) encrypted media 140, and to place encrypted media 140 into a data stream 132 including fully (100%) encrypted media.

Figure 3:
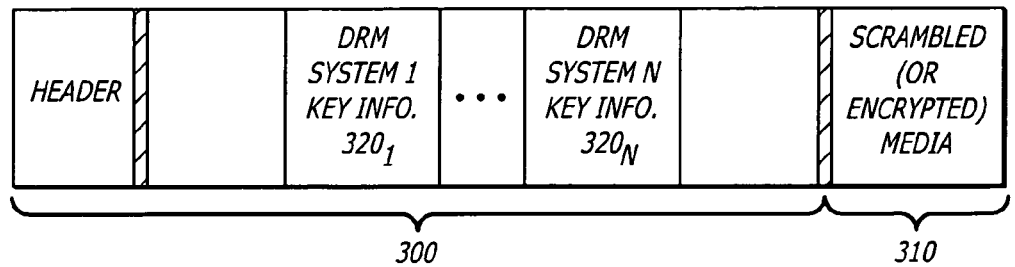
FIG. 3 is an exemplary block diagram of an embodiment of packet-based media from the media transmitting device of FIG. 1.

Herein, media 132 is fully encrypted with a key shared by multiple DRM systems supported by media transmitting device 110. The shared key is encrypted by each DRM system according to a proprietary or publicly used encryption scheme and provided to the media receiving device 120 with the encrypted media or prior to transmission of the encrypted media. As an illustrative example, as shown in FIG. 3, versions of the shared key $320_1$-$320_N$ (N>1) may be encrypted by multiple DRM systems and contained within overhead 300 of data stream 132. Overhead 300 precedes encrypted media 310. Alternatively, one or more versions of the shared key may be transmitted prior to transmission of data stream 132 or sent in an out-of-band (OOB) communication (not shown).

Referring back to FIG. 1, media receiving device 120 may be implemented as a computer, a television, a set-top box, a peripheral (e.g., portable video game console such as SONY® PS2® or PS3® devices) or any other device that is adapted to receive data stream 132 from media transmitting device 110 and to decrypt the fully encrypted media. As an optional feature, media transmitting device 120 may be adapted to communicate back to media transmitting device 110 over interconnect 130 through control signaling 134 for example.

Figure 2:
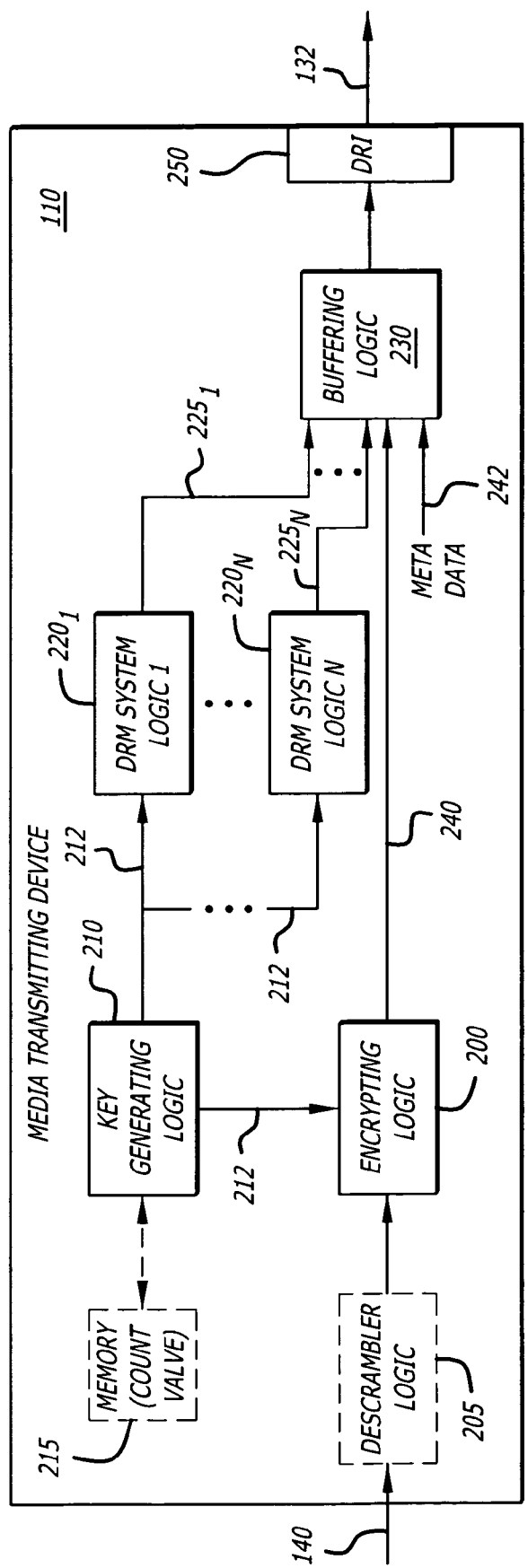
FIG. 2 is an exemplary block diagram of an embodiment of a media transmitting device deployed within the media transmission system of FIG. 1.

Referring now to FIG. 2, an exemplary block diagram of an embodiment of media transmitting device 110 deployed within media transmission system 100 of FIG. 1 is shown. Media transmitting device 110 comprises encrypting logic 200, a key generating logic 210, multiple DRM system logic $220_1$-$220_N$ (where N>1), buffering logic 230 and a digital receiver interface (DRI) 250. Represented by dashed lines, optional descrambler 205 and memory 215 for containing a count value to control expiration of the shared key may be implemented within media transmitting device 110.

Media 140 is received in a clear format is provided to encrypting logic 200. Such media may be received in the clear as an input or, if in an obfuscated format, may be descrambled by descrambler 205. Descrambler 205 would have access to stored keys that may be pre-stored within media transmitting device 110 or transmitted prior to receipt of media 140.

Herein, key generating logic 210 is adapted to generate a key 212 that is provided to encrypting logic 200 and DRM system logic $220_1$-$220_N$. According to one embodiment of the invention, key 212 is used by encrypting logic 200 for encrypting media 140 prior to transmission. Moreover, key 212 is supplied to DRM system logic $220_1, \ldots, 220_N$, each of which encrypts key 212 according to a selected cryptographic function and provides the encrypted keys $225_1$-$225_N$ to buffering logic 230.

It is contemplated that key 212 may be periodically altered by altering a count value stored in memory 215. More specifically, the count value may be used to create sub-keys, namely the count value (e.g., 64-bits in length) may be used as data for a symmetric key operation such as Advanced Encryption Standard (AES) where the cryptographic result constitutes key 212.

Buffering logic 230 operates as a temporary buffer for one or more of the following: encrypted keys $225_1$-$225_N$, encrypted media 240 from encrypting logic 200 and metadata 242. Metadata 242 describes the particulars of encrypted media 240. For instance, where encrypted media is an encrypted movie, metadata 242 may identify the particular cryptographic function used, title of the media, the genre (e.g., drama, action, etc.), or any other particulars. According to one embodiment of the invention, encrypted keys $225_1$-$225_N$, encrypted media 240 and metadata 242 are collectively routed to digital receiver interface (DRI) 250 for transmission as a stream of packets from media transmitting device 110. According to another embodiment, in response to a request for keys from media receiving device 120 of FIG. 1, encrypted keys $225_1$-$225_N$ may be transmitted prior to the formulation of encrypted media 240.

Figure 4A:
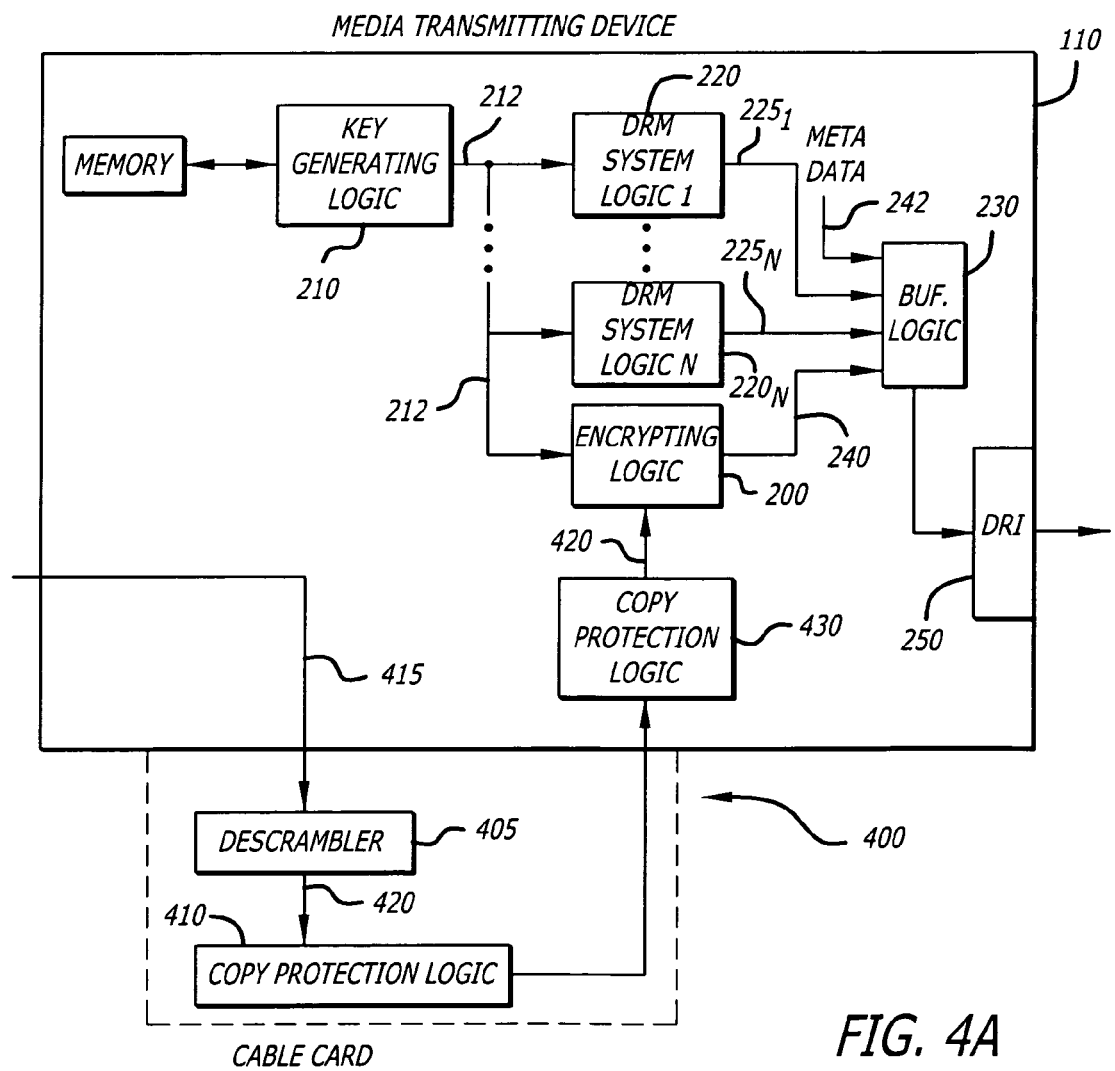
FIG. 4A is an exemplary block diagram of an embodiment of the media transmitting device being a set-top box implemented with a cable card and deployed within the cable system operating as the media transmission system of FIG. 1.

Referring to FIG. 4A, an exemplary block diagram of a first illustrative embodiment of media transmitting device 110 of FIG. 2 is illustrated. As shown, media transmitting device 110 is a set-top box implemented with a cable card 400 and deployed within a cable system operating as media transmission system 100 of FIG. 1.

Cable card 400 comprises a descrambler 405 and copy protection logic 410. More specifically, descrambler 405 receives media 415 in an obfuscated format and recovers media 420 in a clear format. Media 420 undergoes copy protection operations, which include any operation designed to prevent duplication of media 420. Copy protection operations may involve an assignment of access rights to media 420, insertion of a watermark, or obfuscation of media 420 itself.

Media transmitting device 110 includes copy protection logic 430 in communication with copy protection logic 410. This maintains a secure interconnect between cable card 400 and logic mounted on a circuit board within media transmitting device. Once copy protection logic 430 removes the copy protection, media 420 is in the clear format again and is supplied to encryption logic 200, which encrypts media 420 using a key 212 generated by key generating logic 210 and shared with DRM systems $220_1$-$220_N$.

Similar to the operations set forth in FIG. 2, each DRM system logic $220_1$-$220_N$ encrypts key 212 according to a selected cryptographic function and provides the encrypted keys $225_1$-$225_N$ to buffering logic 230. According to one embodiment of the invention, buffering logic 230 collectively routes encrypted keys $225_1$-$225_N$, encrypted media 240 and metadata 242 to digital receiver interface (DRI) 250 for transmission as a stream of packets.

Figure 4B:
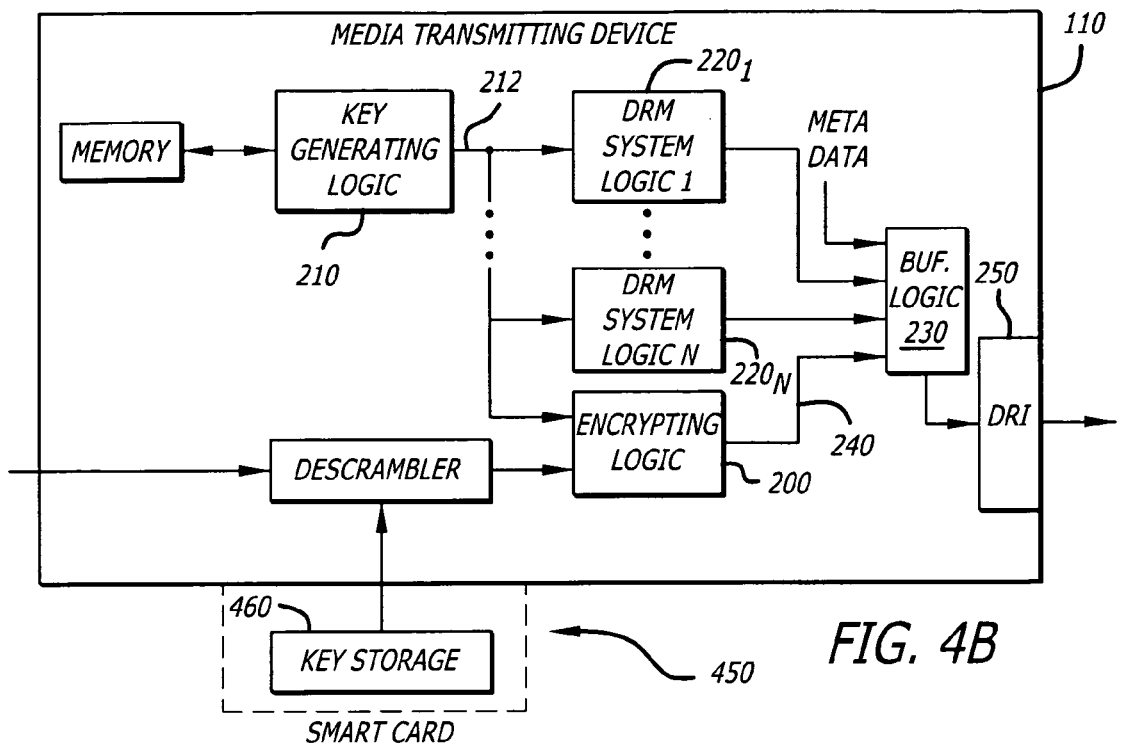
FIG. 4B is an exemplary block diagram of an embodiment of the media transmitting device being a set-top box implemented with a smart card and deployed within the satellite media delivery system operating as the media transmission system of FIG. 1.

Referring to FIG. 4B, an exemplary block diagram of a second illustrative embodiment of media transmitting device 110 of FIG. 2 is illustrated. As shown, media transmitting device 110 is a set-top box implemented with a smart card 500 and deployed within a satellite media delivery system operating as media transmission system 100 of FIG. 1. Smart card 450 comprises key storage 460 that is programmed to store one or more keys for descrambling incoming media upon receipt from a source. Thereafter, the operations are similar to those described in FIG. 2.

Figure 5:
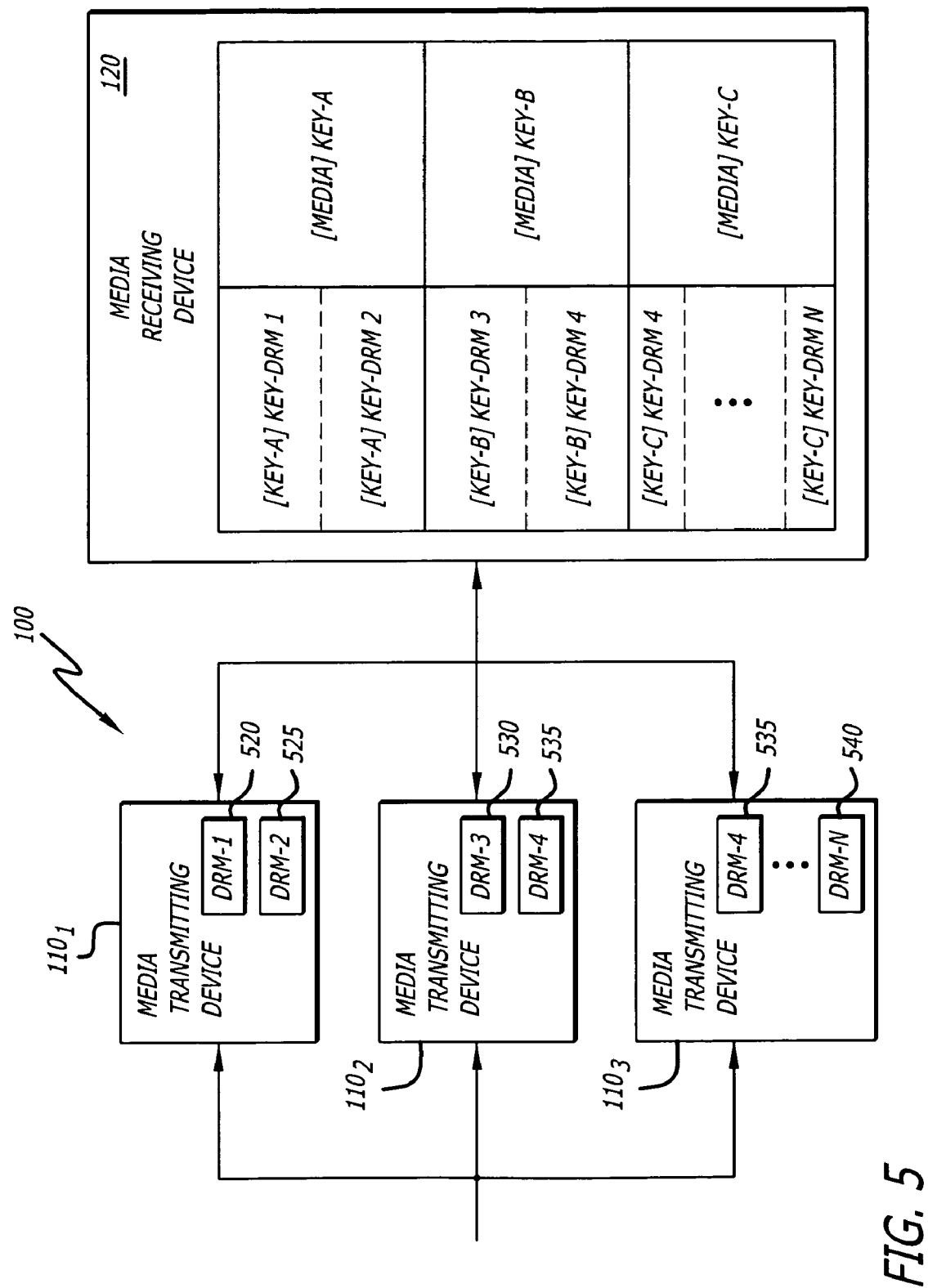
FIG. 5 is an exemplary block diagram of an embodiment of multiple media transmitting devices supporting multiple DRMS performing simultaneous and full encryption on outgoing media for storage within a media receiving device.

Referring now to FIG. 5, an exemplary block diagram of an embodiment of multiple media transmitting devices $110_1$-$110_3$ each performing simultaneous and full encryption on media accessible by multiple DRMs $220_1$-$220_N$ for storage within media receiving device 120 is shown. Herein, multiple media transmitting devices $110_1$-$110_3$ are implemented at a specified location (e.g., office, home, etc.) to receive media 500 over an interconnect 510. As shown, media transmitting devices $110_1$-$110_3$ perform simultaneous recording without conflict.

In particular, as an illustrative example, media transmitting devices $110_1$ supports a first and second type of DRM (e.g., DRM-1 520 and DRM-2 525), while media transmitting device 1102 supports a third and fourth type of DRM (e.g., DRM-3 530 and DRM-4 535) and media transmitting device $110_3$ supports the fourth through $N^{th}$ DRMs (e.g., DRM-4 535 to DRM-N 540). As a result, when all of the media transmitting devices $110_1$-$110_3$ are operational and adapted to store incoming media, the media would be recorded along with three (3) different shared keys illustrated as Key-A, Key-B and Key-C. These keys will be encrypted with keys controlled by the various DRM systems $220_1$-$220_N$, as represented as set forth in Table A below.

TABLE A

| Encrypted Keys Legend | Description |
| --- | --- |
| [Key-A]Key-DRM1 | Key-A encrypted with key associated with DRM-1 |
| [Key-A]Key-DRM2 | Key-A encrypted with key associated with DRM-2 |
| [Key-B]Key-DRM3 | Key-B encrypted with key associated with DRM-3 |
| [Key-B]Key-DRM4 | Key-B encrypted with key associated with DRM-4 |
| [Key-C]Key-DRM4 | Key-C encrypted with key associated with DRM-4 |
| ... | ... |
| [Key-C]Key-DRMN | Key-C encrypted with key associated with DRM-N |

Figure 6:
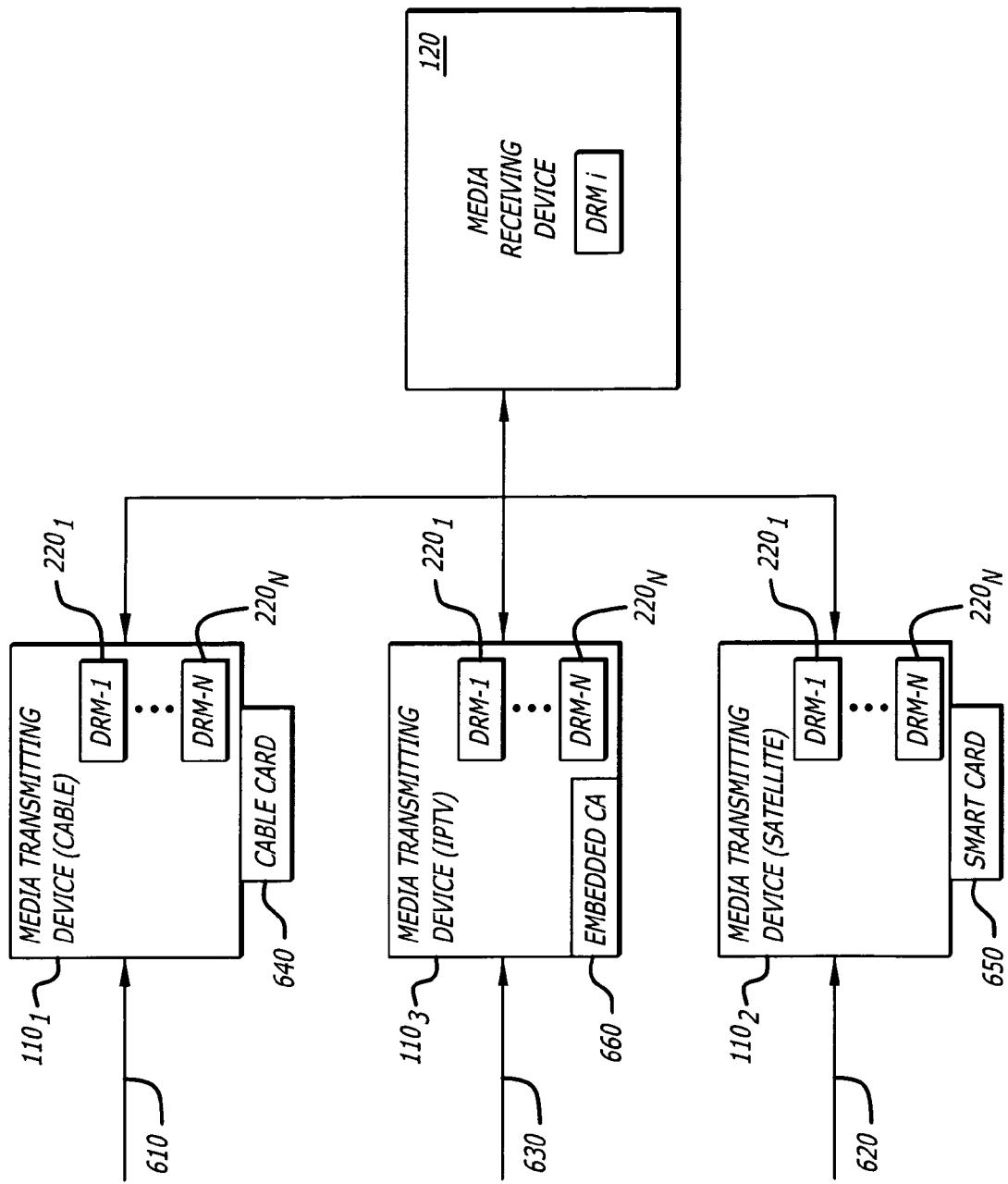
FIG. 6 is an exemplary block diagram of an embodiment of multiple media transmitting devices supporting multiple DRMS and adapted to receive media over different types of interconnects and perform simultaneous and full encryption on media for subsequent playback by a specified DRM of the media receiving device.
Figure 8:
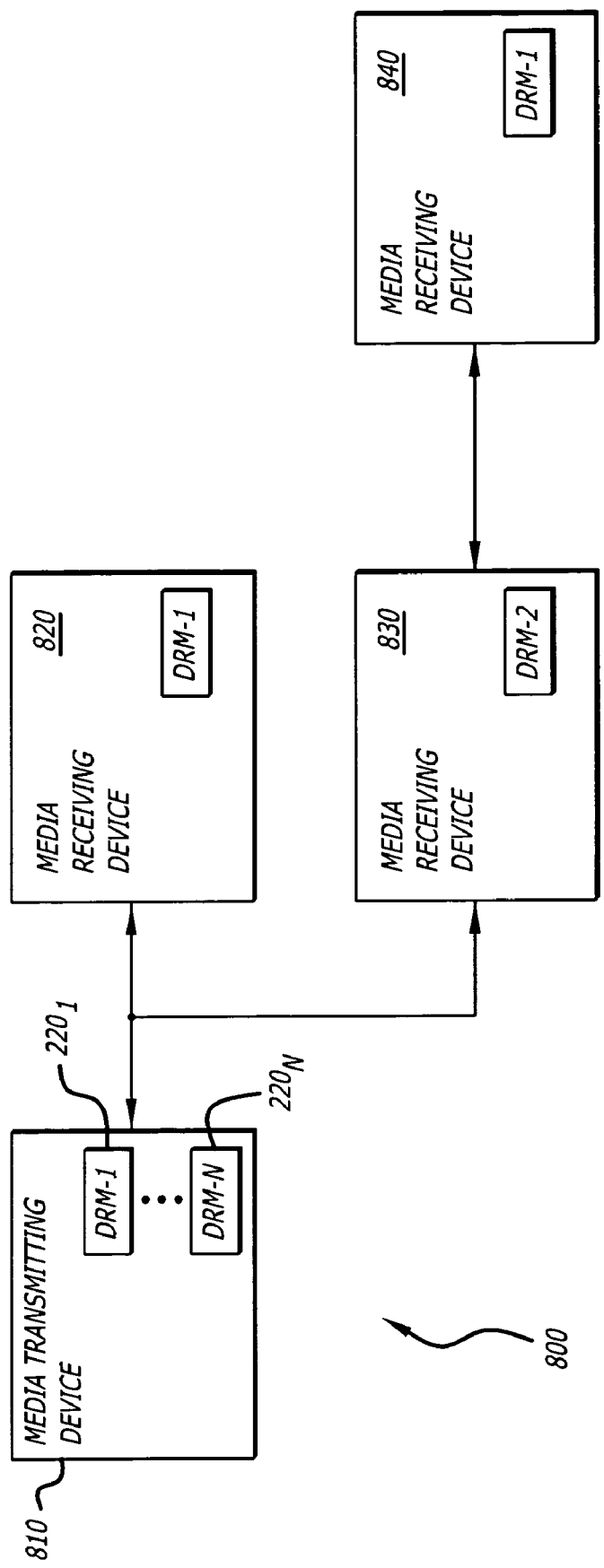
FIG. 8 is an exemplary block diagram of an embodiment of a media transmission system with multiple media receiving devices accessing and recovering media associated with different DRMs.

Referring to FIG. 6, an exemplary block diagram of an embodiment of multiple media transmitting devices performing simultaneous and full encryption on media accessible by multiple DRMs for subsequent playback by a specified DRM of the media receiving device is shown. Herein, multiple media transmitting devices $110_1$-$110_3$ are implemented to receive media 600 from different interconnect types 610, 620 and 630. As shown, media transmitting device $110_1$-$110_3$ are adapted to transmit encrypted media to media receiving device 120. For instance, media receiving device 120 may be a monitor with decryption functionality to enable viewing of the incoming recovered media.

In particular, as an illustrative example, each of media transmitting devices $110_1$-$110_3$ supports multiple DRM (e.g., DRM system logic $220_1$-$220_N$). A first media transmitting devices 110 operates as a set-top box adapted to receive a Cablecard™ 640 as described in FIG. 4A and to receive media over a cable interconnect 610. Second media transmitting devices 1102 operates as a set-top box adapted to receive a smart card 650 as described in FIG. 4B and to receive media over satellite communications 620. Finally, a third media transmitting devices $110_3$ is adapted as a set-top box that receives media over a network (e.g., a wide area network such as the Internet) and is implemented with an embedded conditional access (CA) system 660.

Regardless of the type of interconnect, each of these media transmitting devices $110_1$-$110_3$ is adapted to encrypt the incoming media according to a key shared by all of its DRMs. Thereafter, these media transmitting devices $110_1$-$110_3$ transmit the encrypted media to media receiving device 120. Depending on the one or more DRM implemented within media receiving device 120, the media is decrypted after recovering the shared key and decryption of the encrypted key by the DRM.

Figure 7:
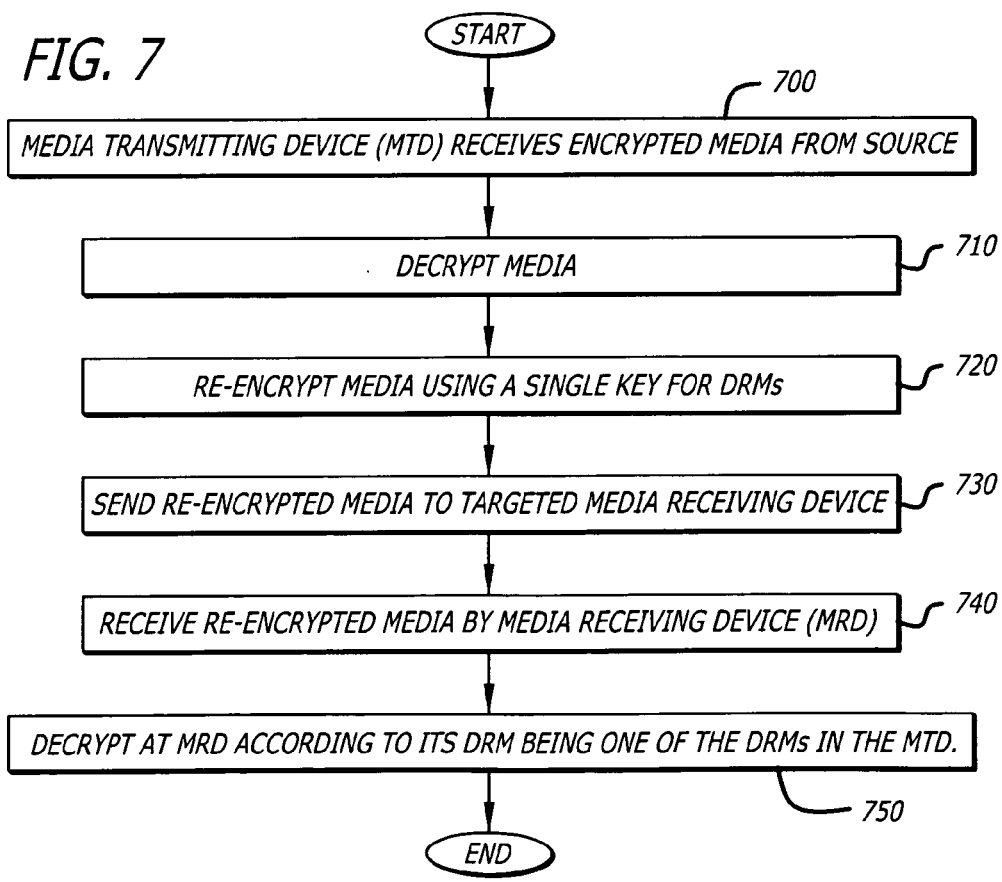
FIG. 7 is an exemplary flow chart depicting operation of a media transmitting device and associated media receiving device(s) on a network consistent with certain embodiments of the present invention.

Referring now to FIG. 7, an exemplary flow chart depicting encoding and decoding operation performed by a media transmitting device and its associated media receiving device(s) is shown. Herein, serving as a gateway, the media transmitting device receives media that is fully encrypted or perhaps selectively encrypted from the service provider (block 700). The encrypted media is decrypted, and then re-encrypted by the media transmitting device using a single key that is shared by multiple DRMs (blocks 710 and 720). Thereafter, the re-encrypted media is transmitted to for various media receiving devices that form a part of a network (block 730).

The transmitted re-encrypted media is received by one or more media receiving devices, where such media is decrypted by recovering the shared key through decryption of the encrypted key by a version of a DRM consistent with one of the multiple DRMs deployed within the media transmitting device (blocks 740 and 750).

As an illustrative example, suppose the home network featured a media transmitting device supporting two DRM technologies (DRM-A and DRM-B) and two media receiving devices, namely a first device (D1) using DRM-A and a second device (D2) using DRM-B. Therefore, the devices (D1, D2) in the home network can select from two or more DRM technologies. Upon receipt of the re-encrypted media by the first device (D1), media may be decoded in real-time or stored and subsequently decrypted. Prior to or concurrently transmitted with the re-encrypted media, multiple versions of the shared key, separately encrypted by DRM-A and DRM-B, are provided. For the first device (D1), the shared key is recovered by decrypting the encrypted shared key that was encrypted by DRM-A. For the second device (D2), the shared key is recovered by decrypting the encrypted shared key that was encrypted by DRM-B. Thereafter, the shared key is used to decode and recover the media in a clear format.

As another illustrative example, suppose a home network 800 featured a media transmitting device 810 supporting multiple DRM technologies (DRM-1 up to DRM-N, where N>1). For this illustrative example, N is equal to 2. Home network 800 further comprises three media receiving devices (MRDs), namely a first MRD 820 (MRD1) using DRM-1, a second MRD 830 (MRD2) using DRM-2 and a third MRD 840 (MRD3) using DRM-1. Therefore, MRD1-MRD3 820-840 in home network 800 can select from two or more DRM technologies. Upon receipt of re-encrypted media by MRD1 820, media may be decoded in real-time or stored and subsequently decrypted. This is accomplished by MRD1 820 recovering a shared key used to re-encrypt the media and decrypting the encrypted shared key that was encrypted by DRM-1. For the second device (MRD2), the shared key is recovered by decrypting the encrypted shared key that was encrypted by DRM-2 while, for the third device (MRD3), the shared key is recovered by decrypting the encrypted shared key that was encrypted by DRM-3. Thereafter, for any of media receiving devices 820-840, the shared key is used to decode and recover the media in a clear format.

Thus, in a manner consistent with certain embodiments, a method of re-encrypting media, such as a digital television signal, involves the following operations: (1) receiving an encrypted digital television signal at a gateway television set top box; (2) decrypting the digital television signal; (3) re-encrypting the digital television signal using a DRM that is compatible with a first targeted device that is to receive the digital television signal; and (4) sending the re-encrypted digital television signal to the first targeted device over a home network.

Figure 9:
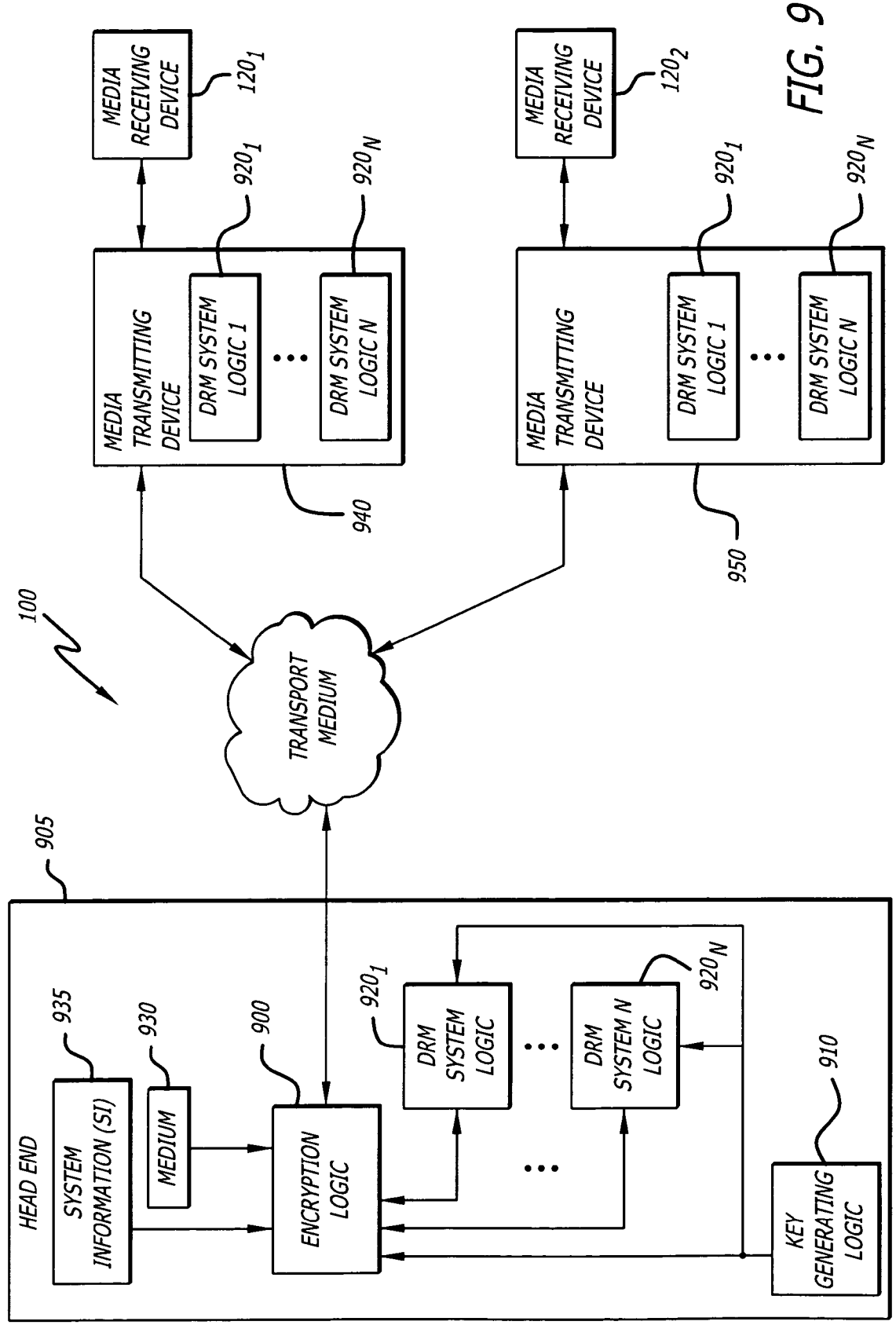
FIG. 9 is an exemplary block diagram of an embodiment of a media transmission system with encrypted DRM keys being transmitted from the head end.

Turning now to FIG. 9, an exemplary block diagram of an embodiment of media transmission system 100 with encrypted DRM keys being transmitted from a head end 905 is shown. At head end 905, media 930 in a clear format is provided to encrypting logic 900 along with at least System Information (SI) 935. Encrypting unit 900 encrypts media 930 with a key shared by DRM system logic $920_1$-$920_N$ and providing by key generating logic 910. Moreover, encrypted version of the shared key are routed from DRM system logic $920_1$-$920_N$, so that the entire media is encrypted and can be recovered when using any of the DRMs.

Media transmitting devices 940 and 950 are represented as set top box that are DRM enabled supporting multiple DRMs $930_1$-$930_N$. These DRMs are adapted to assist in decrypting the encrypted media for play on a targeted media receiving device $120_1$-$120_2$ such as a television sets.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A method comprising:
   generating a shared cryptographic key by a transmitting device; and
   sharing the cryptographic key by a plurality of digital rights management (DRM) systems supplied by different providers, each of the plurality of DRM systems to encrypt the shared cryptographic key, the plurality of DRM systems being included in the transmitting device;
   encrypting media with the shared cryptographic key by the transmitting device;
   receiving the encrypted media and the shared cryptographic key from the transmitting device by a first receiving device;
   decrypting the encrypted media by a first DRM system included in the first receiving device, the first DRM corresponding to one of the plurality of DRM systems included in the transmitting device;
   re-encrypting the media with the shared cryptographic key; and
   transmitting the re-encrypted media from the first receiving device.

2. The method of claim 1 further comprising:
receiving the re-encrypted media by a second receiving device; and
decrypting the encrypted media using the shared cryptographic key by a second DRM system included in the second receiving device, the second DRM system corresponding to one of the plurality of DRM systems included in the transmitting device.

3. The method of claim 1 further comprising:
decrypting incoming media prior to generating the shared cryptographic key by the transmitting device; and
encrypting the media with the shared cryptographic key prior to transmission to a targeted destination by the transmitting device.

4. A media transmitting device comprising:
key generating logic to generate a cryptographic key;
a plurality of digital rights management (DRM) systems supplied from different providers being coupled to the key generating logic, the plurality of DRM systems
to receive the shared cryptographic key, and
to encrypt the shared cryptographic key to produce a plurality of uniquely encrypted shared cryptographic keys, respectively; and
buffering logic in communication with the key generating logic and the plurality of DRM systems, the buffering logic to collectively transmit media encrypted with the cryptographic key and versions of the cryptographic key uniquely encrypted by each of the plurality of DRM systems.

5. The media transmitting device of claim 4 further comprising:
encryption logic coupled to the key generating logic, the encryption logic to encrypt the media with the cryptographic key provided by the key generating logic.

6. The media transmitting device of claim 5 further comprising:
a memory coupled to the key generating logic, the memory to store a count value that is used to indicate expiration of the cryptographic key and prompt the key generating logic to produce a new cryptographic key to be shared by the plurality of DRM systems.

7. The media transmitting device of claim 5 further comprising:
a first copy protection logic coupled to the encryption logic; and
a cable card including a descrambler to descramble incoming media received by the media transmitting device, and copy protection logic to establish a secure interconnect between the cable card and a second copy protection logic mounted on a circuit board within the media transmitting device.

8. The media transmitting device of claim 5 further comprising:
an interface coupled to the buffering logic for transmission of the media encrypted with the cryptographic key and versions of the cryptographic key uniquely encrypted by each of the plurality of DRM systems.

9. The media transmitting device of claim 5 further comprising:
a descrambler to descramble incoming media received by the media transmitting device; and
a smart card including key storage being programmed to store one or more keys for descrambling the incoming media upon receipt from a source.

10. A media transmitting device comprising:
a descrambler logic to descramble encrypted media from a service provider;
a key generating logic to generate a shared cryptographic key;
an encrypting logic being coupled to the descrambler logic and the key generating logic, the encrypting logic to receive the shared cryptographic key and to encrypt the descrambled media using the shared cryptographic key;
a plurality of digital rights management (DRM) systems supplied by different providers being coupled to the key generating logic, each of the plurality of DRM systems:
to receive the shared cryptographic key, and
to encrypt the shared cryptographic key to produce a uniquely encrypted shared cryptographic keys;
a buffering logic being coupled to the key generating logic and the plurality of DRM systems, the buffering logic to collectively transmit media encrypted with the cryptographic key and versions of the cryptographic key uniquely encrypted by each of the plurality of DRM systems.

* * * * *